April 28, 1925.
R. D. EVANS
1,535,589
ELECTRICAL MEASURING INSTRUMENT
Filed July 30, 1920
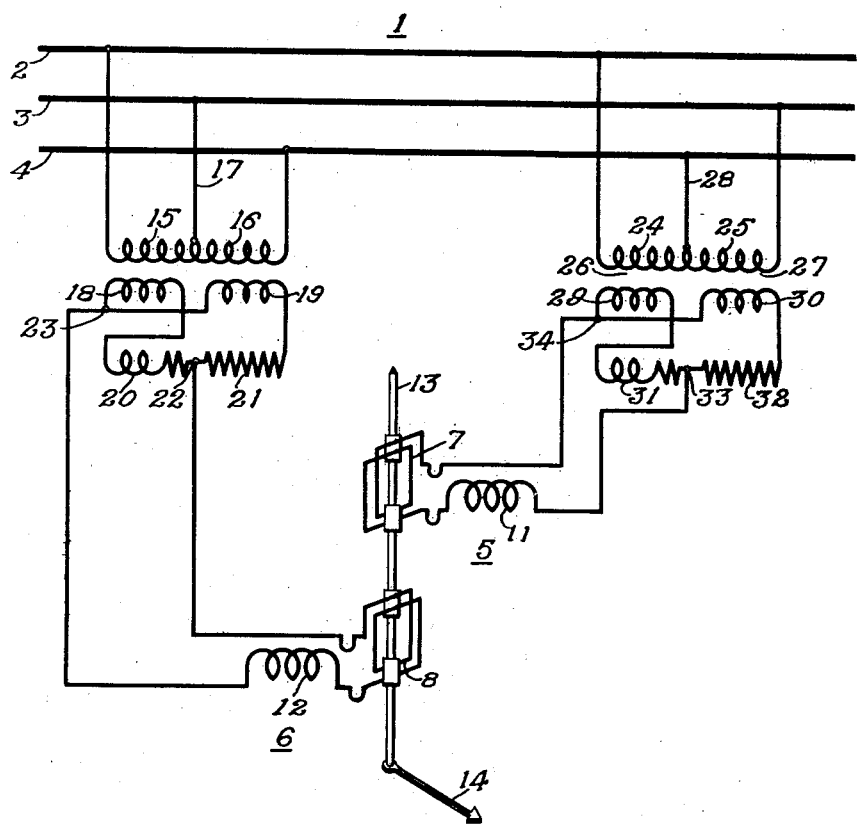
WITNESSES:
J. A. Helsel
J. M. Procter
INVENTOR
Robert D. Evans
BY
Berkey Carr
ATTORNEY Patented Apr. 28, 1925.

1,535,589

UNITED STATES PATENT OFFICE.

ROBERT D. EVANS, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed July 30, 1920. Serial No. 400,163.

*To all whom it may concern:*

Be it known that I, ROBERT D. EVANS, a citizen of the United States, and a resident of Pittsburgh, in the county of Allegheny and State of Pennsylvania, have invented a new and useful Improvement in Electrical Measuring Instruments, of which the following is a specification.

My invention relates to measuring instruments and particularly to unbalance-factor meters.

One object of my invention is to provide a meter that shall indicate directly a factor of the unbalance of electrical quantities on a circuit.

Another object of my invention is to provide a meter that shall indicate directly the ratio of the positive and negative phase-sequence components of electrical quantities.

A further object of my invention is to provide a meter, of the above indicated character, that shall be simple and inexpensive to construct and effective in its operation.

In practicing my invention, I provide a movable member and means for actuating the movable member in one direction in accordance with the positive phase-sequence component and, in the other direction, in accordance with the negative phase-sequence component of an electrical quantity of the circuit. With this arrangement, the ratio of the positive and negative phase-sequence components is obtained and, since this is a measure of the unbalance, it may be termed the unbalance factor. This factor may be obtained for either current or voltage unbalance.

The single figure of the accompanying drawing is a diagrammatic view of an electric circuit embodying my invention.

An electric circuit 1 comprises conductors 2, 3 and 4, the voltage-unbalance factor of which is to be determined. Two electrical measuring instruments 5 and 6 comprise armature windings 7 and 8 and field windings 11 and 12, respectively. The armature windings 7 and 8 are mounted on a shaft 13 upon which a pointer 14 is also mounted. The windings 11 and 12 are displaced 90° with respect to each other and co-operate with the windings 7 and 8 to actuate the pointer 14. The pointer 14 is adapted to co-operate with a scale (not shown) to indicate the ratio of the two torques tending to turn the armature windings 7 and 8.

Two transformers 15 and 16 are connected, through a common conductor 17, to the conductor 3 of the circuit 1, and the remaining terminals of the windings 15 and 16 are connected to the conductors 2 and 4. The secondary windings 18 and 19 of the transformers are connected in series with an impedance device 20 and a resistor 21. The winding 12 is connected from a point 22 between the resistor and the reactive impedance device and a point 23 between the windings 18 and 19. With this arrangement, the winding 12 is provided with current proportional to the positive phase-sequence component of the voltage impressed on the circuit 1.

The characteristics of the impedance devices 20 and 21 are such that voltages produced thereacross by a common current, or the currents caused to traverse the same by a common voltage, would be equal in value and angularly displaced 60°. That is, the phase angles of the two devices differ by 60° and the value of the impendances are equivalent.

Under such conditions, no current will traverse the winding 12 when the circuit 1 is balanced, but the winding 12 will be traversed by current, as above stated, when the circuit is unbalanced. This current, with the connections illustrated, has been found to be the positive component of a symmetrical system into which the unsymmetrical system of the balanced voltage of the circuit may be resolved.

Primary windings 24 and 25 of two transformers 26 and 27 are connected between a common conductor 28 to the conductor 4 of the circuit 1, and the remaining terminals of the windings 24 and 25 are connected to the conductors 2 and 3 of the circuit 1. Secondary windings 29 and 30 of the transformers 26 and 27 are connected in circuit with a reactive impedance device 31 and a resistor 32, and the winding 11 of the instrument 5 is connected from a point 33, between the resistor and the reactive impedance device, to a point 34 between the windings 29 and 30. With this arrangement, the winding 11 is supplied with current proportional to the negative phase-sequence component of the voltage impressed on the circuit 1. The resistor 32 and the reactive impedance device 31 are of the same proportions as described with respect to the impedance device 20 and the resistor 21, thus precluding current from traversing the winding 11 under balanced conditions in the circuit 1. With this arrangement, current does traverse the winding 11 when the voltage of the circuit is unbalanced and it has been found that this current is, with the connections shown, proportional to the negative component of a symmetrical system into which the unsymmetrical system of the unbalanced voltage of the circuit may be resolved.

The instruments 5 and 6 are so arranged that the windings 7 and 8 are actuated, in opposite directions, with a torque proportional to the positive and negative phase-sequence components of the voltage impressed on the circuit 1 and, consequently, the pointer 14 will indicate this ratio or the voltage-unbalance factor of the circuit.

While I have shown a device for determining the voltage unbalance of the circuit, the windings 11 and 12 may be connected through devices that are responsive to the current phase-sequence to indicate the current unbalance of the circuit.

My invention is not limited to the specific structures illustrated, as it may be variously modified without departing from the spirit and scope of the same, as set forth in the appended claims.

I claim as my invention:

1. An unbalance-factor meter comprising two electro-responsive devices, a single means actuated thereby differentially and means for energizing one electro-responsive device in accordance with the positive and the other in accordance with the negative phase-sequence component of an electrical quantity.

2. An unbalance-factor meter for a polyphase electric circuit comprising a movable member, and oppositely acting means for actuating the movable member, said means being actuated in accordance with two phase-sequence components of an electrical quantity of the circuit.

3. An unbalance-factor meter for a polyphase electric circuit comprising a movable member, means responsive to the positive phase-sequence component of the voltage for actuating the member in one direction and means responsive to the negative phase-sequence component of the voltage for actuating the member in the other direction.

4. An unbalance-factor meter for a polyphase electric circuit comprising two armature windings, a single shaft therefor, two field windings one of which is energized in accordance with one symmetrical component of the unbalanced voltage of the circuit and the other in accordance with another symmetrical component of the unbalanced voltage of the circuit.

5. An unbalance-factor meter for a polyphase electric circuit comprising two armature windings, a single shaft therefor, two displaced field windings for the armature windings, means for supplying the one armature and one field winding with current in accordance with the positive phase-sequence component of the unbalanced voltage of the circuit and means for supplying the other armature and field winding with current in accordance with the negative phase-sequence component of the unbalanced voltage of the circuit.

6. An unbalance-factor meter for a polyphase electric circuit comprising two armature windings, a single shaft therefor, stationary windings for co-operating with the armature windings and stationary means for energizing one stationary winding in accordance with the positive and the other in accordance with the negative phase-sequence component of the voltage of the circuit.

7. An unbalance-factor device for a polyphase electric circuit comprising a movable member and differentially-connected actuating means for said member energized in accordance with the positive and negative phase-sequence components of an electrical quantity of the circuit respectively to actuate said member in accordance with the unbalance factor of the circuit.

8. The combination of a polyphase circuit, differentially-connected electro-responsive devices connected to said circuit and means connected between one of said devices and the circuit to cause said device to be energized in accordance with a symmetrical component of an unbalanced characteristic of the circuit.

9. The combination of a polyphase circuit, differentially-connected electro-responsive elements associated therewith and means whereby said elements are energized in accordance with the positive and negative phase-sequence components of an electrical quantity of the circuit.

10. The combination of a polyphase circuit, a movable member and means for actuating said member in accordance with the relative values of the positive and the negative phase-sequence component of voltage in said circuit.

In testimony whereof, I have hereunto subscribed my name this 19th day of July 1920.

ROBERT D. EVANS.